United States Patent [19]

Fletcher

[11] Patent Number: 4,805,957

[45] Date of Patent: Feb. 21, 1989

[54] AUTOMOBILE WINDOW SILL ARM REST AND SUNSCREEN

[76] Inventor: Paul J. Fletcher, 44122 N. 20th St., East, Space 46, Lancaster, Calif. 93534

[21] Appl. No.: 208,469

[22] Filed: Jun. 20, 1988

[51] Int. Cl.$^4$ .............................................. B60J 9/00
[52] U.S. Cl. ................................... 296/153; 296/97.9; 296/97.5; 297/413
[58] Field of Search .................. 296/153, 97.1, 97.5, 296/97.8, 97.9, 97.11; 297/412, 413; 160/DIG. 3, DIG. 4

[56] References Cited

U.S. PATENT DOCUMENTS

| | | | |
|---|---|---|---|
| 2,274,026 | 2/1942 | Allen | 296/153 |
| 2,462,768 | 2/1949 | Orheb | 296/153 |
| 2,601,052 | 6/1952 | Ortleb | 296/153 |
| 2,738,220 | 3/1956 | Simmons | 296/153 |
| 2,777,730 | 1/1957 | Parshall | 296/153 |
| 2,803,493 | 8/1957 | Haefliger | 296/153 |
| 2,877,049 | 3/1959 | Lucas | 296/153 |
| 3,025,098 | 3/1962 | Andrews | |

Primary Examiner—Johnny D. Cherry
Assistant Examiner—Brian Sells
Attorney, Agent, or Firm—Kenneth R. Bowers, Jr.

[57] ABSTRACT

A flexible arm rest for an automobile window sill which is attached by magnets to the outside of the automobile, hangs over the sill, and is urged downward within the automobile by weights. The magnets exert a force on the arm rest which exceeds the force by the weights, with the consequence that raising the window causes the inside edge to move upward until the arm rest is captured between the window and the window jam, in which configuration the arm rest functions as a sunscreen or sunshade.

10 Claims, 2 Drawing Sheets

AUTOMOBILE WINDOW SILL ARM REST AND SUNSCREEN

BACKGROUND

This invention relates to protective covers for automobile window sills which are intended to prevent chaffing and other discomfort to a user when the sill is used to support a human arm, and to sunscreens which filter out solar light during passage through window glass.

It is common practice for an operator or passenger in an automobile to rest his/her arm on the sill of a nearby open window while seated in the vehicle. Many automobile manufacturers install an arm rest on the side of the door on the inner surface, but this arm rest is not comfortable for many persons because it is too low or because it constrains the arm within the confines of the vehicle. Even though the person may be more comfortable with his/her arm resting on the window sill, long term contact with the sill becomes uncomfortable because of the contact with the edge of the window and with the crack in the door which provides for upward and downward egress of the window. In hot weather, the sill may be too hot for use as an arm rest.

The automobile industry has attempted to provide a variety of covers which facilitate the use of the sill as an arm rest. Refer to U.S. Pat. No. 2,803,493, to W. W. Haefliger, incorporated herein by reference as a first incorporated reference. Other references of interest are U.S. Pat. Nos. 2,777,730 to Parshall, 2,274,026 to Allen, 3,451,717 to Carter, 2,601,052 to Ortleb, 3,603,637 to DePinto, and 2,877,049 to Lucas, all relating to arm rests of various types.

The passage of sunlight through the glass of an automobile window is often excessive and many devices exist to filter out specific harmful wavelengths or to generally reduce the brightness of transmitted light. The window glass may be tinted or covered permanently or temporarily by a thin film of translucent material or may be covered temporarily by a shield of opaque material. Many temporary shields prove cumbersome while permanent shields lack versatility. Refer to U.S. Pat. No. 3,025,098 to A. A. Andrews, incorporated herein by reference as a second incorporated reference. U.S. Pat. No. 3,489,457 to Pike is of interest also.

It is an object of this invention to provide an arm rest for the window sill of an automobile which is comfortable and convenient.

It is a further object of this invention to provide an arm rest for the window sill of an automobile which can also be used to screen or shade solar radiation from the interior of the automobile.

SUMMARY OF THE INVENTION

A flexible arm rest and sun screen for an automobile comprising a cover padded in a region which covers the window sill. A cover is securable to the outside surface of the automobile by a row of magnets sewn into pockets at one end of the cover and has weights sewn into pockets at the opposite end of the cover. The magnets are attracted to the steel side of the automobile with a net force which exceeds the net weight of the cover and its weights and frictional forces such that upward movement of the glass window shifts the cover weighted end upward without movement of the magnet loaded end until the window captures the cover by snubbing it against the upper jam of the door. The cover serves as a sunscreen in this configuration and may be translucent or opaque as desired in the portion which covers the window. The cover has a slot to allow passage of and noninterference with the door lock. Edges of the cover which face into the wind during forward and backward movement of the automobile are rounded to reduce wind induced vibration and noise. In a preferred embodiment, the cover is designed to be usable with both left and right hand doors and accordingly has two door lock slots.

DETAILED DESCRIPTION

Figure 1:
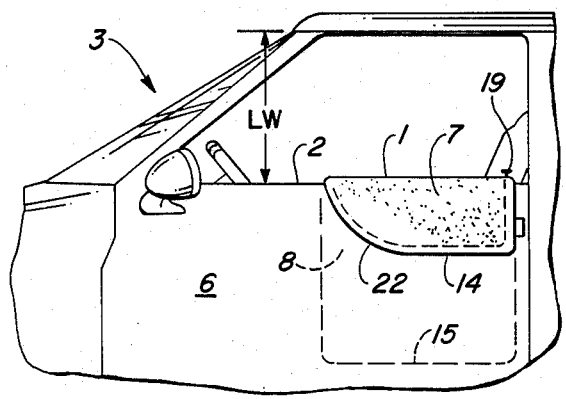
FIG. 1 is a cut-away elevation view of the exterior of the left front door of a automobile, with its window open and retracted, having an installed arm rest.
Figures 6, 7:
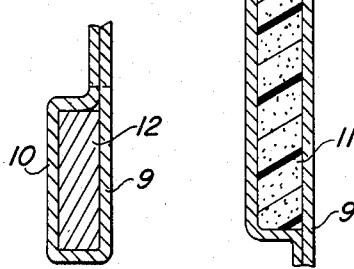

In its simplest form, the invented arm rest is a flexible, approximately rectangular cover made of heavy canvas or clothe, which hangs over the sill of an automobile window to cushion the arm of a driver or passenger. Refer to FIG. 1 in which an arm rest 1 is shown hanging over window sill 2 of automobile 3. Window 5 is not visible in FIG. 1 because the window is open and the glass window 5 is down inside door 6. The portion of arm rest 1 which is in view in FIG. 1 is numbered 7 and extends outside automobile 3. A portion of arm rest 1 extends inside automobile 3 and is numbered 8 in FIG. 1. It may be desired to fabricate the arm rest of two layers of clothe as shown in FIG. 7. A first layer of clothe 9 is stitched to a second layer 10. A inner pad 11 is captured between layers 9 and 10 which pad 11 is disposed to rest directly over sill 2, providing a cushion for the arm of the user. The means by which layer 9 is attached to layer 10 forms no part of the invention and is not illustrated in the drawings. This means may include glue, stitches, and may be eliminated by folds in a single piece of material so that the inner and outer layers are a single integral whole.

Figure 3:
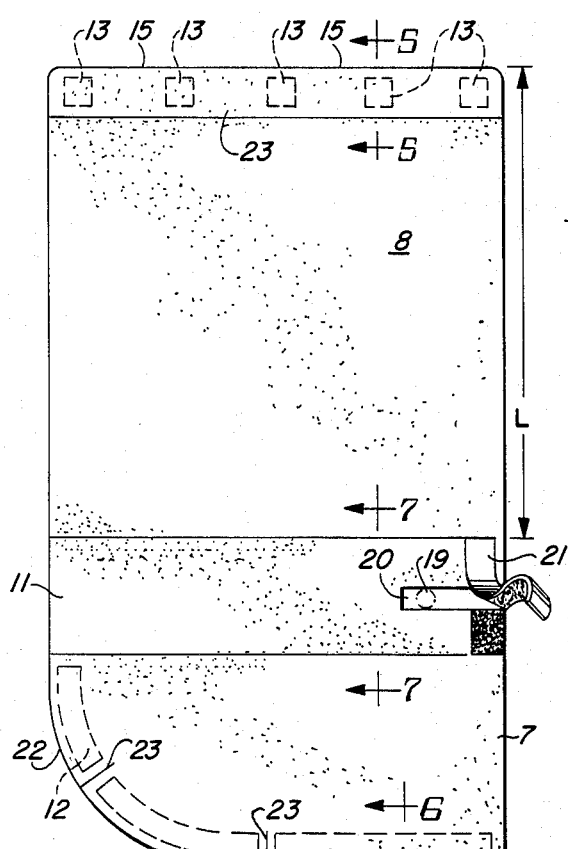
FIG. 3 is a plan view of the arm rest as it would appear if placed on a flat surface.

In FIG. 3, it can be seen that a plurality of magnets 12 are disposed along an end 14 of portion 7 which extends outside automobile 3. Magnets 12 are strips of magnetic material, encased between layers 9 and 10 as shown in FIG. 6. Magnets 12 are used to secure end 14 to the iron surface of door 6.

Figure 5:
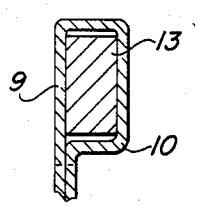
FIGS. 5, 6, and 7 are sectional details from FIG. 3 as indicated.

In FIG. 3, it can be seen that a plurality of weights 13 are disposed along an end 15 of portion 8 which extends inside automobile 3. Weights 13 are preferentially bars of a heavy material such as iron and are encased between layers 9 and 10 as shown in FIG. 5. Weights 13 are used to urge end 15 downward by the force of gravity.

Figures 8, 9:
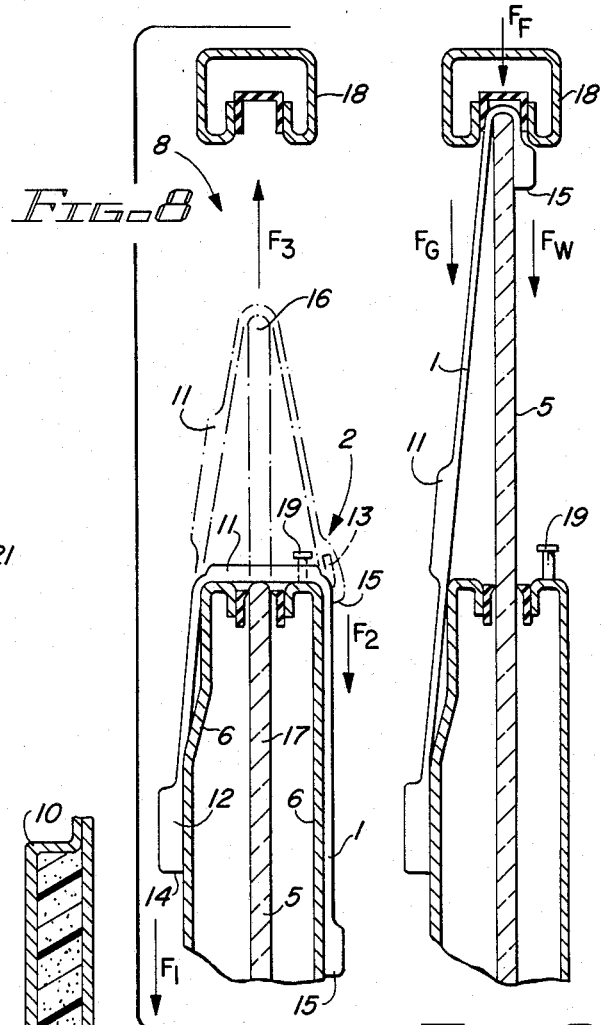
FIG. 8 is a section through the automobile door showing the window in a retracted, open configuration and also in a partially closed position.
FIG. 9 is a section through the automobile door showing the window in a closed position.

The number of weights 13, the mass of each weight 13, the number of magnets 12, and the magnetic strength of each magnet 12, are all chosen so that the force of magnets 12 exerted on door 6 exceeds to combined weight of weights 13 with the result that when a force on arm rest 1 is applied by window 5, end 14 does not move but end 15 shifts upward. Refer to FIG. 8. In this edge-on and sectioned view of door 6, glass window 5 is visible inside door 6. Arm rest 1 is shown hanging over sill 2. At extended position 16, window 5 has been moved upward from down position 17, exerting a force F3 upward on arm rest 1. Magnets 12 exert a force F1 on door 6 and on arm rest 1 which opposes force F3. Weights 13 exert a collective force on arm rest 1 which together with the net weight of the arm rest itself and frictional forces is represented as F2 in FIG. 5. Magnets 12 are sufficient in number and magnetic strength that force F1 exceeds force F2, so that while window 5 moves from position 17 to position 16, end 14 does not move while end 15 shifts upward. Continued upward travel of window 5 will eventually result in the configuration of FIGS. 2 and 9 in which window 5 has snugged arm rest 1 into the top of door jam 18. Length L in FIG. 3, the length of portion 8 between edge 15 and pad 11, is greater than the height of window 5 (LW in FIG. 1) so that the capture of arm rest 1 in jam 18 occurs before end 15 of arm rest 1 is pulled completely over the top of window 5 and falls outside the automobile.

In FIG. 9, FW is the combined weight of all weights 13, FG is the weight of the arm rest 1 portion which is outside the automobile in this configuration, and FF is the force of friction between window 5, jam 18, and arm rest 1. Weights 13 are sufficient in number and mass that force FW exceeds the sum of Forces FG and FF so that when window 5 is returned to the down position, end 15 shifts downward and arm rest 1 returns to the configuration of FIG. 1.

Figure 2:
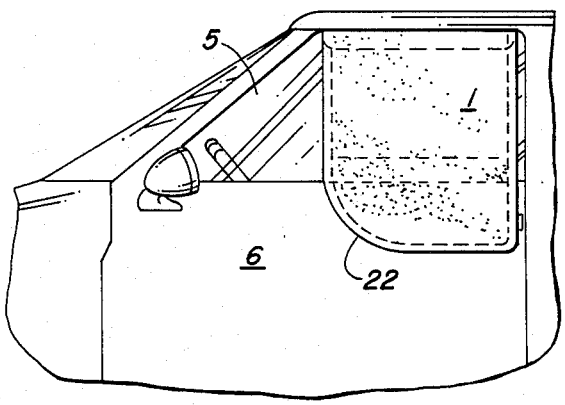
FIG. 2 is a cut-away elevation view of the exterior of the left front door of an automobile, having an installed arm rest, similar to FIG. 1, in which in departure from the configuration of FIG. 1 the window has been raised to the closed position, lifting the arm rest upward to serve as a sunscreen.

The advantage in the aforedescribed use of magnets outside the automobile and weights inside the automobile is that arm rest 1 can be used as both an arm rest when in the down position of FIG. 1 and as a sunscreen when in the position of FIGS. 2 and 9, and can be converted from one use to the other by merely raising and lowering the window. The entire arm rest 1 or portion 8 thereof, may be either opaque or partially translucent depending on whether it is preferred to entirely block the transmission of light or screen out a portion of the light.

Door 6 may have a post-like lock 19 which extends out of sill 2. In the region of arm rets 1 in which pad 11 is located, a slot 20 is provided to permit passage of lock 19 through the cover. After lock 19 passes through slot 20, a velcro tab 21 can be fastened to close slot 20.

Edge 14 of portion 7 has at least one curved or rounded section 22 rather than the ninety degree corners which are at end 15 of portion 8. Curved section 22 has magnets 12 disposed along it to tightly secure arm rest 1 to door 6 against the force of the wind which will strike portion 7 during forward movement of automobile 3.

Gaps 23 between magnets 12 and weights 13 enable arm rest 1 to be conveniently folded for storage.

PREFERRED EMBODIMENT

Figure 4:
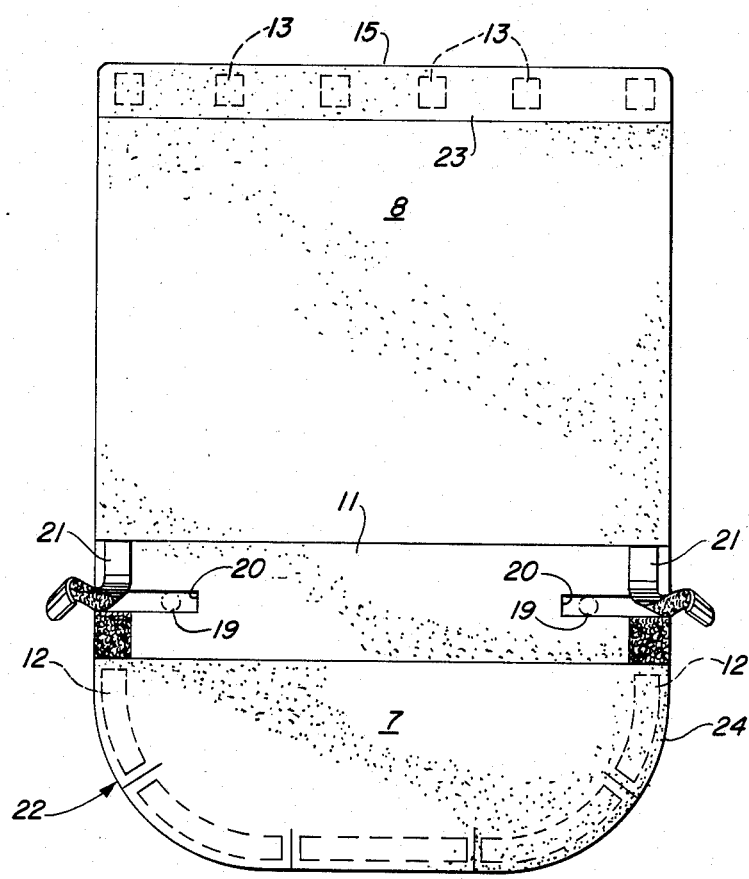
FIG. 4 is a plan view of the arm rest in a preferred embodiment which allows use on either left or right side automobile doors as the mat would appear if placed on a flat surface.

FIG. 4 illustrates a preferred embodiment which has been modified over the device of FIG. 3 to provide that a single arm rest can be used with both right and left side doors and to minimize noise and vibration during movment of the automobile in both the forward and backward direction. Portion 7 of arm rest 1 has two rounded portions 22 and 24 so that a curved section is presented to the wind in either the forward or backward direction of travel of autombile 3. Arm rest 1 has two slots 20 and two velcro tabs 21 combinations so that the 180 degree rotation of arm rest 1 which occurs when arm rest 1 is changed from the left to the right side of automobile 3 continues to present lock 19 with a slot 20 in juxtaposition. Both curved sections 22 and 24 have magnets 12 along the entire length of the section to hold arm rest 1 tightly to door 6 and to prevent vibration and noise during movement of automobile 3 forward and backward. Section 8 may also have one or more velcro tabs to gather up or fold up a portion of the cover if length L in FIG. 3 is too long.

The inclusion of magnets 12 and weights 13 in clothe pockets or within layers of clothe muffles noise due to wind induced vibration and generally prevents chaffing scratched to surfaces, especially painted surfaces, of the automobile.

It should be noted that it is possible to hang arm rest 1 inside automobile 3 with weights 13 at the top and end 15 captured by window 5 in jam 18 and end 14 with magnets 12 at the bottom. It is envisioned that the user may elect to use arm rest 1 in this manner when automobile 3 is parked.

In the drawings, like numerals refer to like features throughout.

The contemplated use of the invention is not limited to automobiles but may generally be used with any type of motor vehicle, including those commonly described as automobiles, trucks, motor homes, and even aircraft and boats. For purposes of interpretation of the claims, the term "vehicle" is defined to include all the above.

In the claims, the term "sunscreen" is defined to include an arm rest which is entirely opaque, or which is partially translucent. The term "weight means" includes the weight of the clothe cover disposed inside the automobile as well as specially provided weights. It is known that the weight of the clothe may suffice and no specially provided weights may be needed.

From the foregoing, it is believed that a person of ordinary skill in the art can successfully manufacture the contemplated invention without recourse to further information. However, the first and second incorporated references are available as an integral part of this specification.

While in this specification, in the drawings, and in the claims, a general invention has been described, it is apparent to those skilled in the art to which this invention pertains that numerous modifications and changes can be made without departure from the true spirit and scope of the invention. For example, a surface of the arm rest may be emblazoned with an emergency message to be available for display if needed. Therefore, the specification should be considered descriptive rather than limiting.

I claim:

1. An arm rest for a window sill of a vehicle said arm rest comprising a flexible cover having opposite sides, having along a first side magnet means for securing said first side to an iron surface of said vehicle and having along a second side opposite said first side weight means for urging by gravity said arm rest downward when said arm rest is disposed across said sill with said frist side outside said vehicle and said second side inside said vehicle, wherein said magnet means exerts a magnetic force on said iron surface and on said arm rest which force exceeds the force by which said weight means urges said arm rest downwards with the consequence that an upward force on said arm rest exerted by a window of said vehicle during closure of said window causes said second side having weight means to shift upwards as said window moves upward, and said first side having magnet means does not move, and wherein said weight means exerts a force by gravity downward on said second side which gravity force exceeds frictional forces and the weight force on said arm rest acting upward on said second side with the consequence that as said window moves downward to open said window of said vehicle, said second side shifts downward.

2. The arm rest of claim 1 wherein the height of said second side below said sill exceeds the length by which said window moves from fully open to fully closed with the consequence that fully closing said window results in the capture of said arm rest in a door jam above said sill instead of dropping said arm rest outside said vehicle, thereby disposing said arm rest to cover said window to serve as a sunscreen.

3. The arm rest of claim 1 wherein said flexible cover has a slot in one side which slotted side is perpendicular to said first and second sides and said slot is parallel to said first and second sides, said slot located in the portion of said arm rest which is in contact with said sill in juxtaposition with a door lock in said sill and disposed to permit passage through said cover by said lock.

4. The arm rest of claim 1 wherein said flexible cover has a slot in one side which slotted side is perpendicular to said first and second sides and said slot is parallel to said first and second sides, said slot located in the portion of said arm rest which is in contact with said sill in juxtaposition with a door lock in said sill and disposed to permit passage through said cover by said lock, and said slot has closure means for closure of said slot after passage therethrough by said lock.

5. The arm rest of claim 1 wherein said flexible cover is composed of translucent material.

6. The arm rest of claim 1 wherein said flexible cover is composed of opaque material.

7. The arm rest of claim 1 wherein said magnet means is a plurality of magnets having a gap therebetween each magnet.

8. The arm rest of claim 1 wherein said weight means comprises a plurality of weights having a gap therebetween each weight.

9. An arm rest for a window sill of a vehicle said arm rest comprising a flexible, approximately rectangular cover having along a first side magnet means for securing said first side to an iron surface of said vehicle and having along a second side opposite said first side weight means for urging by gravity said arm rest downward when said arm rest is disposed across said sill with said first side outside said vehicle and said second side inside said vehicle, wherein said magnet means exerts a magnetic force on said iron surface and on said arm rest which force exceeds the force by which said weight means urges said arm rest downwards with the consequence that an upward force on said arm rest exerted by a window of said vehicle during closure of said window causes said second side having weight means to shift upwards as said window moves upward, and said first side having magnet means does not move, and wherein said weight means exerts a force by gravity downward on said second side which gravity force exceeds frictional forces and the weight force on said arm rest acting upward on said second side with the consequence that as said window moves downward to open said window of said vehicle, said second side shifts downward, wherein said flexible cover has slots in each of two sides which slotted sides are perpendicular to said first and second sides and said slots are parallel to said first and second sides, said slots located in the portion of said arm rest which is in contact with said sill in juxtaposition with a door lock in said sill and disposed to permit passage through said cover by said lock, said slots enabling installation of said arm rest on both right and left sides of said vehicle.

10. The arm rest of claim 9 wherein at least two corners of the approximately rectangular cover are rounded rather than square to reduce the force exerted on the cover by wind.

* * * * *